(12) United States Patent
Reiderman et al.

(10) Patent No.: US 7,834,622 B2
(45) Date of Patent: Nov. 16, 2010

(54) CONFIGURABLE MAGNET ASSEMBLY FOR USING IN NMR WELL LOGGING INSTRUMENT

(75) Inventors: Arcady Reiderman, Houston, TX (US); David R. Beard, Houston, TX (US); Carl M. Edwards, Katy, TX (US)

(73) Assignee: Baker Hughes Incorporated, Houston, TX (US)

( * ) Notice: Subject to any disclaimer, the term of this patent is extended or adjusted under 35 U.S.C. 154(b) by 301 days.

(21) Appl. No.: 11/874,532

(22) Filed: Oct. 18, 2007

(65) Prior Publication Data

US 2009/0102478 A1 Apr. 23, 2009

(51) Int. Cl.
*G01V 3/00* (2006.01)

(52) U.S. Cl. ........................ 324/303; 324/307
(58) Field of Classification Search ............ 324/303, 324/307, 309
See application file for complete search history.

(56) References Cited

U.S. PATENT DOCUMENTS

| | | | |
|---|---|---|---|
| 4,710,713 A | 12/1987 | Strikman | |
| 4,717,877 A | 1/1988 | Taicher et al. | |
| 5,220,223 A | 6/1993 | Mehnert | |
| 5,629,624 A * | 5/1997 | Carlson et al. | 324/309 |
| 5,712,566 A | 1/1998 | Taicher et al. | |
| 5,962,819 A | 10/1999 | Paulsson | |
| 6,206,133 B1 | 3/2001 | Paulsson | |
| 6,229,422 B1 | 5/2001 | Pignataro | |
| 6,263,984 B1 | 7/2001 | Buckman, Sr. | |
| 6,466,416 B1 | 10/2002 | Honjo et al. | |
| 6,580,273 B2 | 6/2003 | Reiderman et al. | |
| 6,856,132 B2 | 2/2005 | Appel et al. | |
| 6,868,035 B2 | 3/2005 | West | |
| 2003/0097978 A1 | 5/2003 | Glavish et al. | |
| 2004/0042150 A1 | 3/2004 | Swinbanks et al. | |
| 2004/0113627 A1 | 6/2004 | West et al. | |
| 2004/0117119 A1 | 6/2004 | West et al. | |
| 2005/0189945 A1 | 9/2005 | Reiderman | |
| 2006/0255799 A1 | 11/2006 | Reiderman | |

OTHER PUBLICATIONS

Phillip B. West et al. , "Clamping Systems for Large Downhole Seismic Sensor Arrays" Idaho National Engineering and Environmental Laboratory, Jun. 2001.

(Continued)

*Primary Examiner*—Louis M Arana
(74) *Attorney, Agent, or Firm*—Cantor Colburn LLP

(57) ABSTRACT

A magnet assembly for measuring properties of a formation from a borehole, the magnet assembly including a first device and a second device, each device adapted for insertion into the borehole, the first device producing a first magnetic field, the second device producing a second magnetic field; wherein the second magnetic field is configurable for one of reinforcing and reducing the first magnetic field; and wherein the first device comprises a permanent magnet and the second device comprises at least one of one of a switchable magnet and switching windings.

15 Claims, 8 Drawing Sheets

OTHER PUBLICATIONS

NLB Corp Water jetting Nozzle Catalog., pp. 1-63 (Jan. 1998).
Mauer, "Novel Drilling Techniques", Pergamon Press, pp. 38-45 and 96-97 (1968).
D.A. Summers, et al., "Diajet Use in an Environmental Application", University of Missouri-Rolla, High Pressure Waterjet Laboratory Rolla, MO 65401. pp. 281-291.
Pendleton, et al., "Bechtel develops innovative method for horizontal drilling" Technology Oil & Gas Journal pp. 95-99, (May 27, 1985).
M.N. Miller et al, "Spin Echo Magnetic Resonance Logging: Porosity and Free Fluid Index Determination" SPE No. 20561, Society of Petroleum Engineers, Richardson, TX (1990). pp. 321-334.
A. Timur.,"Pulsed Nuclear Magnetic Resonance Studies of Porosity, Movable Fluid, and Permeability of Sandstones," Journal of Petroleum Technology, Jun. 1969, pp. 775-786.
R.C. Herrick et al. "An Improved Nuclear Magnetism Logging System and its Application to Formation Evaluation," SPE 8361 presented at the 54th Annual Fall Technical Conference and Exhibition of the SPE of AIME held in Las Vegas, Nevada., Sep. 23-26, 1979.
R. K. Cooper, et al. "Remote (Inside-Out) NMR. I. Remote Production of a Region of Homogeneous Magnetic Field," Journal of Magnetic Resonance, 41, 400-405 (1980).
L.J. Burnett, et al. "Remote (Inside-Out) NMR, II Sensitivity of NMR Detection of External Samples", Journal of Magnetic Resonance 41,406-410(1980).
J.A. Jackson, L.J. Burnett and J.F. Harmon "Remote (Inside-Out) NMR, III, Detection of Nuclear Magnetic Resonance in a Remotely Produced Region of Homogeneous Magnetic Field," Journal of Magnetic Resonance 411-421 (1980).
C.P. Slichter "Principles of Magnetic Resonance," Appendix G, Springer-Verlag Berlin Heidelberg, New York, 1980.
Dichenko et al. "Separation device for the Sensing Element . . . ", Sep. 1982, NEFT KHOZ, No. 9, pp. 58-61. (English Translation attached. 6 pages).
International Search Report for International Application No. PCT/US 08/80333. Mailed Jun. 2, 2009.
Written Opinion of the International Searching Authority for International Application No. PCT/US 08/80333. Mailed Jun. 2, 2009.

* cited by examiner

CONFIGURABLE MAGNET ASSEMBLY FOR USING IN NMR WELL LOGGING INSTRUMENT

BACKGROUND OF THE INVENTION

1. Field of the Invention

The present invention relates to nuclear magnetic resonance for well logging. Specifically, the invention relates to a recent generation nuclear magnetic resonance well logging instruments using permanent magnets as a source of a static magnetic field.

2. Description of the Related Art

In exploration for hydrocarbons, it is important to make accurate measurements of geologic formations. The geologic formations below the surface of the earth may contain reservoirs of oil and gas. The geologic formations may include formation bedding planes and various structures. In a quest for oil and gas, it is important to know about the location and composition of the formation bedding planes and the various structures. In particular, it is important to know about the geologic formations with a high degree of accuracy so that drilling resources are not wasted. Measuring properties of the geologic formations provides information that can be useful for locating the reservoirs of oil and gas. Generally, the oil and gas are accessed by drilling boreholes into the subsurface of the earth. The boreholes also provide access for taking measurements of the geologic formations.

Well logging is a technique used to take measurements of the geologic formations from the boreholes. In one embodiment, a logging instrument is lowered on the end of a wireline into the borehole. The logging tool sends data via the wireline to the surface for recording. Output from the logging instrument comes in various forms and may be referred to as a "log." One type of measurement involves using nuclear magnetic resonance (NMR) to measure properties of the geologic formations.

A recent generation of NMR well logging instruments use permanent magnets as a source of a static magnetic field (see U.S. Pat. Nos. 4,710,713; 4,717,877; 5,712,566; and 6,580,273). Prior art devices implementing NMR technology using the permanent magnets normally require high-energy magnetic material for the permanent magnet. One reason for using the high-energy magnetic material is to maximize the static magnetic field in a region of interest. In general, stronger static magnetic fields result in a higher signal to noise ratio (SNR) for an NMR signal or alternatively a deeper depth of investigation. Another reason for using the high-energy magnetic material is to provide stability of magnet magnetization in a high-temperature environment. For the high-energy magnetic material, a combination of a high coercivity and a small temperature coefficient of magnetization and coercivity is highly desirable to avoid irreversible loss of magnetization. The irreversible loss of magnetization will eventually cause demagnetization of the permanent magnet. Besides the fact that the permanent magnet is expensive, the permanent magnet also causes a problem resulting from a high attractive force when passing through a steel surface casing lining the borehole. Electromagnets that may solve the problem cannot operate as well as the permanent magnets in downhole applications. U.S. Pat. No. 4,717,877 discloses a magnet assembly with moveable parts that offers a solution for varying a magnetic field of a magnet assembly in order to perform radial imaging as well as for transporting the magnet.

Also known in the art are electrical and mechanical switchable magnets used for lifting magnetized objects. A system representing switchable magnets is disclosed, for example, in U.S. Pat. No. 6,229,422. A magnet assembly comprises two magnets with a coil around one of the magnets. The magnets are connected with a magnetically permeable frame. Energizing the coil in one direction reverses polarization of one magnet, thereby effectively "short circuiting" magnetic flux produced by the other magnet. The short circuiting of the magnetic flux terminates holding the magnetized object. Energizing the coil in the opposite direction causes parallel polarization of the magnets thereby switching the magnet assembly into a holding mode. The switchable magnet systems known in the art are not conducive for use in down-hole NMR measurements because of high energy storage requirements and an inability to provide complete zeroing of an external magnetic field.

What are needed are techniques for providing a switchable magnet having an energy storage requirement conducive for use in downhole NMR measurements with the switchable magnet providing zeroing of the external magnetic field.

BRIEF SUMMARY OF THE INVENTION

The shortcomings of the prior art are overcome and additional advantages are provided through a magnet assembly for measuring properties of a formation from a borehole, the magnet assembly including a first device and a second device, each device adapted for insertion into the borehole, the first device producing a first magnetic field, the second device producing a second magnetic field; wherein the second magnetic field is configurable for one of reinforcing and reducing the first magnetic field; and wherein the first device comprises a permanent magnet and the second device comprises at least one of one of a switchable magnet and switching windings.

Also disclosed is a method for configuring a magnet assembly in a borehole, the method including placing the assembly in the borehole; forming a substantially zero-dipole mode in the assembly for at least one of performing nuclear quadrapole resonance measurements and moving the magnetic assembly in the borehole without a substantial magnetic attraction to a magnetic casing; and forming a substantially full-dipole mode in the assembly for performing nuclear magnetic resonance (NMR) measurements.

Further disclosed is a method for producing a magnet assembly, the assembly adapted for use in a borehole, the method including selecting a permanent magnet; selecting at least one of switching windings and a switchable magnet; and combining the permanent magnet and at least one of the switching windings and the switchable magnet to form the assembly.

BRIEF DESCRIPTION OF THE DRAWINGS

Referring now to the drawings wherein like elements are numbered alike in the several Figures.

DETAILED DESCRIPTION OF THE INVENTION

The teachings provide a configurable magnet assembly for use in a well logging instrument. The configurable magnet assembly enables the logging instrument to traverse a borehole without the configurable magnet assembly providing a high attractive force on a ferromagnetic surface casing. The configurable magnet assembly can be configured in either a zero-dipole mode or a full-dipole mode. In the zero-dipole mode, the configurable magnet assembly provides a minimal to zero magnetic field to minimize any attractive force on the ferromagnetic surface casing. The configurable magnet assembly may also be configured in a full-dipole mode such that the magnet assembly provides a sufficient magnetic field with which to perform NMR measurements on formations.

In addition to performing the NMR measurements, the well logging instrument may be configured for performing nuclear quadrapole resonance (NQR) measurements. The NQR measurements are essentially zero magnetic field measurements. Any practical configurable magnetic assembly in the zero-dipole mode may still have some residual magnetization. The teachings provide a magnetic shield to shield a small residual magnetic flux thereby practically eliminating the residual magnetic field. The magnetic shield may also essentially remove distortions to the earth's magnetic field caused by the configurable magnet assembly for earth's magnetic field NNM measurements.

The configurable magnet assembly includes devices for producing two magnetic fields, a first magnetic field and a second magnetic field. The devices may be at least one of magnets and windings. The second magnetic field can be produced in opposition to the first magnetic field, thereby, reducing the first magnetic field. The first magnetic field can be reduced enough to form the zero-dipole mode. Similarly, the second magnetic field may be produced to reinforce the first magnetic field. Reinforcing the first magnetic field with the second magnetic field forms the full-dipole mode.

Figure 1:
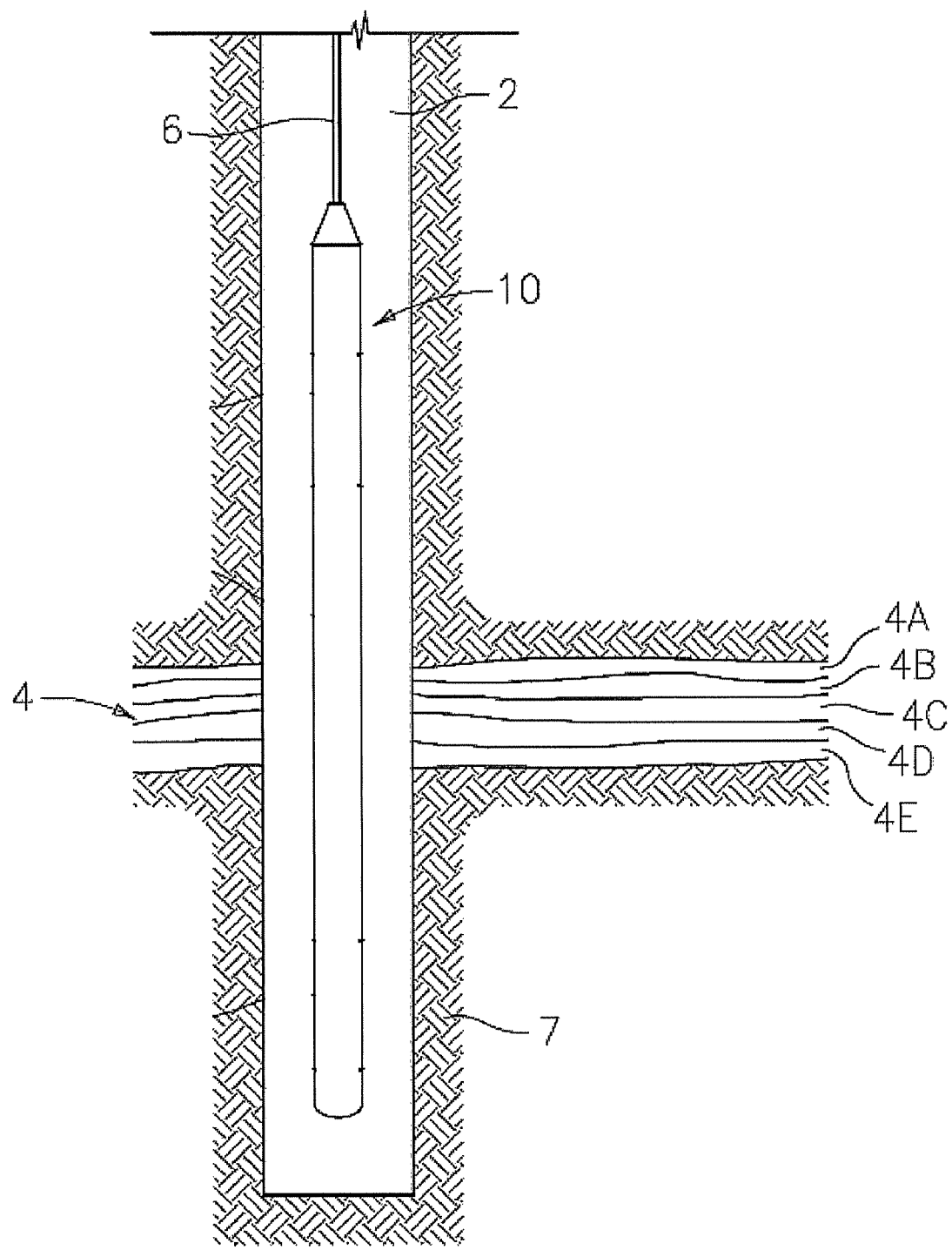
FIG. 1 illustrates an exemplary embodiment of a logging instrument in a borehole penetrating the earth.

Referring to FIG. 1, a well logging instrument 10 is shown disposed in a borehole 2. The borehole 2 is drilled through earth 7 and penetrates formation 4, which include various layers 4A-4E. The instrument 10 is generally lowered into and withdrawn from the borehole 2 by use of an armored electrical cable 6 or similar conveyance as is known in the art. As used herein, the well logging instrument 10 may be used for nuclear magnetic resonance (NMR) measurements of the formations 4. In another configuration, the well logging instrument 10 may be used for both NMR measurements and NQR measurements of the formations 4. The configurable magnet assembly is disposed within the logging instrument 10.

In some embodiments, the borehole 2 includes materials such as would be found in oil exploration, including a mixture of liquids including water, drilling fluid, mud, oil and formation fluids that are indigenous to the various formations. One skilled in the art will recognize that the various features as may be encountered in a subsurface environment may be referred to as "formations." Accordingly, it should be considered that while the term "formation" generally refers to geologic formations of interest, that the term "formations," as used herein, may, in some instances, include any geologic points of interest (such as a survey area).

Figure 2A:
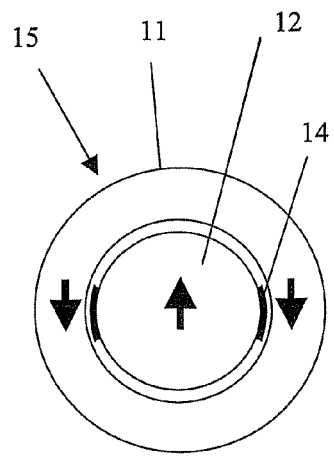
FIG. 2A and 2B, collectively referred to as FIG. 2, illustrate a first exemplary embodiment of a configurable magnet assembly.
Figure 2B:
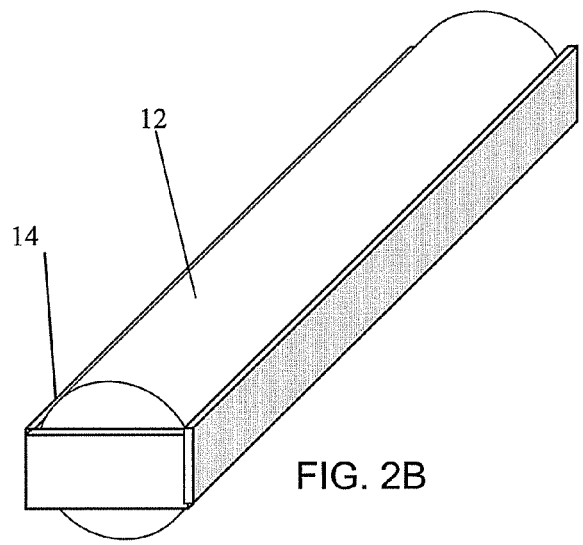
Figure 3:
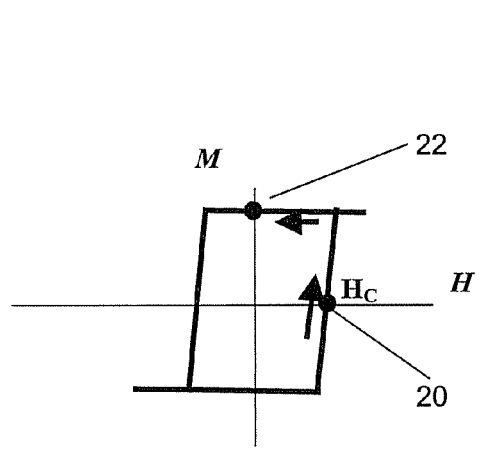
FIG. 3 illustrates an example of a magnetization curve.

FIG. 2 illustrates an exemplary embodiment of a configurable magnet assembly 15. Referring to FIG. 2A, the configurable magnet assembly 15 includes a permanent magnet 11 in a form of a hollow cylinder, a switchable magnet 12 in the form of a cylinder, and switching windings 14. In the embodiment of FIG. 2, the permanent magnet 11 generally maintains a constant magnetic field. The permanent magnet 11 may be made of a permanent magnet material. The switchable magnet 12 is coaxial and internal to the permanent magnet 11 in the embodiment of FIG. 2. Directions of magnetization of the permanent magnet 11 and the switchable magnet 12 in the zero-dipole mode are depicted by arrows in FIG. 2A. FIG. 2B illustrates another view of the switchable magnet 12 and the switching windings 14. Generally, a cross-sectional area of the switchable magnet 12 is about equal to the cross-sectional area of the permanent magnet 11. In general, dipole magnetic moments of the permanent magnet 11 and the switchable magnet 12 are about equal. In order to reverse magnetization of the switchable magnet 12, a pulse of current is applied to the switching windings 14 to overcome a coercive force of a permanent magnetic material used for the switchable magnet 12. FIG. 3 illustrates an example of a magnetization curve for the permanent magnetic material with magnetization M versus an external magnetic field H. Referring to FIG. 3, a coercive force 20 ($H_C$) of the permanent magnetic material is shown on the magnetization curve.

Energy is generally lost during the reverse magnetization of the switchable magnet 12. The energy lost may be calculated as $$W_{loss} = \frac{\mu_0 \cdot M_r^2}{2} \cdot V,$$

where $M_r$ is residual magnetization 22 of the permanent magnetic material as shown in FIG. 3 and V is a volume of the switchable magnet 12. The energy loss is about 10 KJ for usual values of the residual magnetization 22 and the switchable magnet 12 being about six feet long and about four inches in diameter. There may also be additional losses associated with the switching windings 14. The reverse magnetization process is relatively fast to minimize DC power losses in the switching windings 14. The reverse magnetization process uses a low inductance coil driven by a high pulsed current. The high pulsed current is supplied by an energy storage device. The energy storage device using capacitive technology and operating at a high temperature can store up to 0.1 J/cc. For the switchable magnet 12 discussed above, the energy storage device corresponds to a 10,000 cc (about 4 inches depth×50 inches length) storage size.

Figure 4:
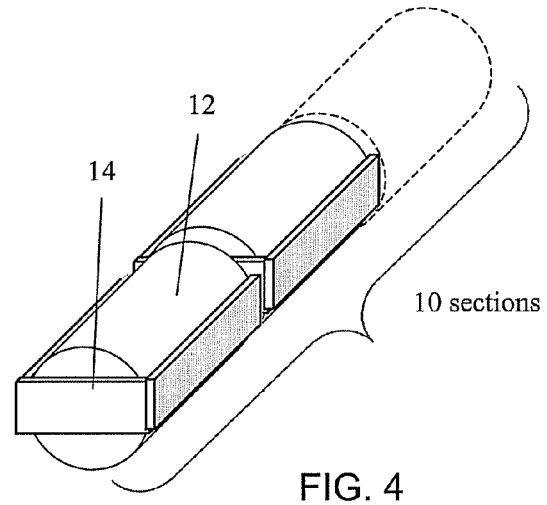
FIG. 4 illustrates an exemplary embodiment of a sectional arrangement of the configurable magnet assembly.

In order for the configurable magnet assembly 15 to be operational at high temperatures in the borehole 2, the coercive force 20 of the permanent magnetic material at a surface temperature needs to be about twice the coercive force 20 at the high temperatures. Doubling the coercive force 20 results in about doubling the energy loss during the reverse magnetization ($W_{loss}$) or about twice the 10 KJ energy loss estimate. Correspondingly, the storage size may be as much as 100 inches long by 4 inches deep. In order to reduce the storage size, the switchable magnet 12 may be divided into a number of sections. Each of the sections requires much less storage size for magnetization reversal than for the switchable magnet 12 that is non-sectioned. FIG. 4 illustrates one exemplary embodiment of a ten-section arrangement of the switchable magnet 12. Referring to FIG. 4, the sections are magnetized sequentially one after another with some waiting time needed to charge the energy storage device from a DC power line available down the borehole 2.

Figures 5, 6:
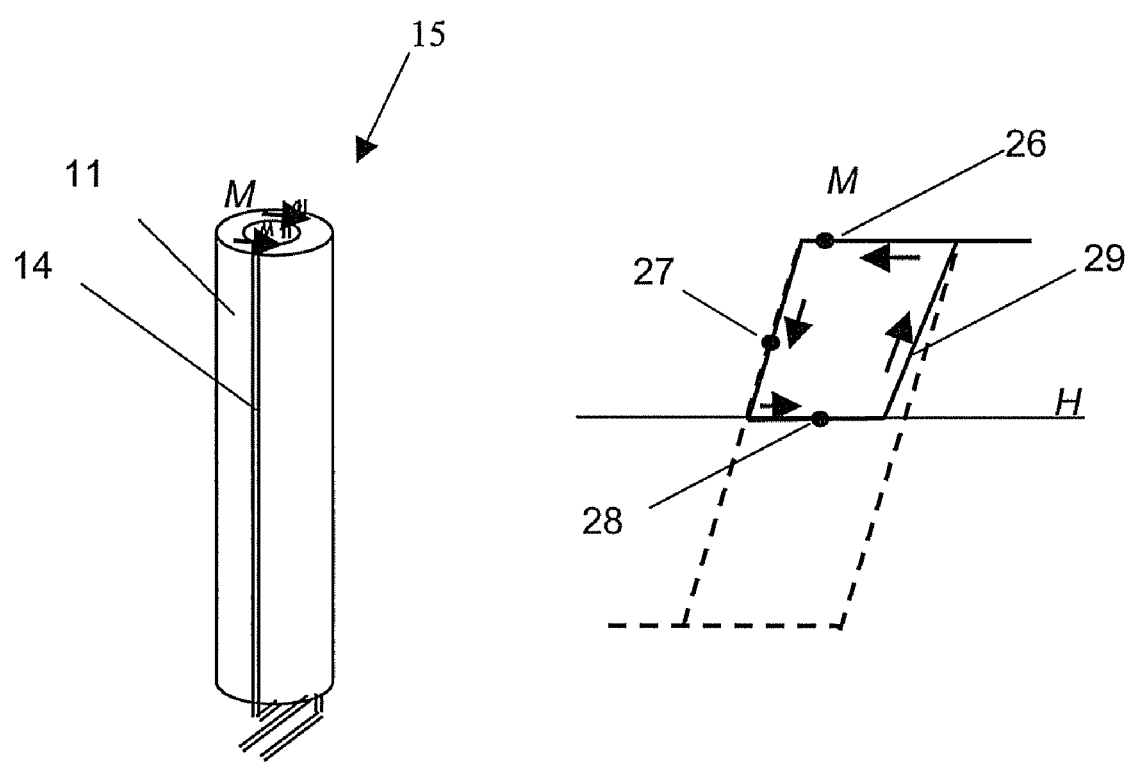
FIG. 5 illustrates a second exemplary embodiment of the configurable magnet assembly.
FIG. 6 illustrates an example of a minor hysteresis loop.

FIG. 5 illustrates a second embodiment of the configurable magnet assembly 15. Referring to FIG. 5, the configurable magnet assembly 15 includes the permanent magnet 11 with a hollow cylindrical shape and the switching windings 14. The switching windings 14 are disposed internal and external to the permanent magnet 11. The switching windings 14 are disposed in such a way that current conducted through the switching windings 14 will cause a magnetic dipole to form in the permanent magnet 11 in a direction indicated by arrows in FIG. 5. FIG. 6 illustrates one example of a magnetization versus magnetic field curve with a minor hysteresis loop for the permanent magnet 11 used in the embodiment of FIG. 5. Referring to FIG. 6, the permanent magnet 11 in a magnetized state (denoted by point 26) is demagnetized by a pulsed magnetic field created by a corresponding pulse of current in the switching windings 14. An amplitude of the pulsed magnetic field is approximately equal to the coercive force 20 of the permanent magnet 11. A corresponding change in magnetization of the permanent magnet 11 resulting from the pulsed magnetic field is represented by points 26, 27, and 28 on the minor hysteresis loop (represented by a solid line) in FIG. 6. The change in magnetization may be referred to as demagnetization. By measuring the residual magnetic field of the permanent magnet 11 with a magnetic probe, the amplitude of the pulsed magnetic field can be adjusted in order to obtain substantially zero magnetization of the permanent magnet 11. In some embodiments, the demagnetization may be performed by applying alternating magnetic field bursts with a slowly decaying amplitude. The permanent magnet 11 may be returned to the magnetized state (denoted by point 26) by applying a magnetic field pulse in a direction that causes magnetization according to an ascending part 29 of the minor hyteresis loop shown in FIG. 6.

Figure 7:
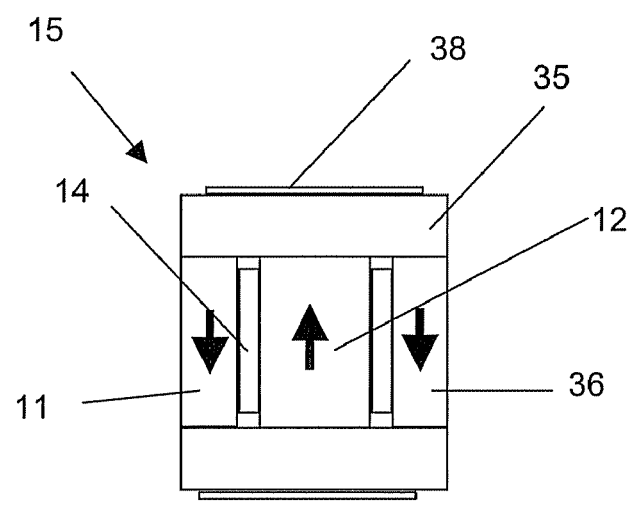
FIG. 7 illustrates a third exemplary embodiment of the configurable magnet assembly.

A third embodiment of the configurable magnet assembly 15 is illustrated in FIG. 7. Referring to FIG. 7, the configurable magnet assembly 15 includes the permanent magnet 11, the switchable magnet 12, the switching windings 14, and a soft magnetic element 35. The directions of magnetization of the permanent magnet 11 and the switchable magnet 12 in the zero-dipole mode are depicted by the arrows in FIG. 7. The soft magnetic element 35 conducts magnetic flux between magnet poles of the permanent magnet 11 and the switchable magnet 12 in the zero-dipole mode. Thus, the soft magnetic element 35 reduces an external magnetic field of the configurable magnet assembly 15 to substantially zero. In a preferred embodiment, the soft magnetic element 35 is made of a high saturation soft magnetic material that is non-conductive. The soft magnetic element 35 may also serve as a part of an NMR antenna assembly to enhance the efficiency of the NMR antenna assembly. FIG. 7 illustrates an NMR antenna winding 38.

Figure 8:
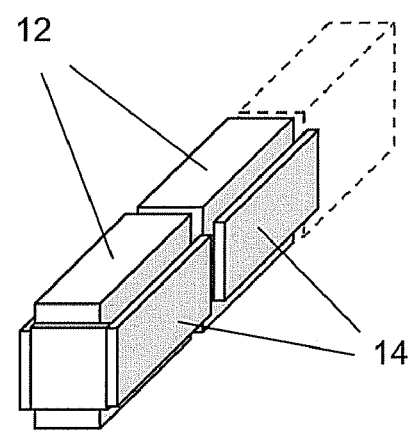
FIG. 8 illustrates an exemplary embodiment of a sectional arrangement of the third exemplary embodiment of the configurable magnet assembly.

The configurable magnet assembly 15 shown in FIG. 7 has a generally rectangular shape in contrast to a generally cylindrical shape of the configurable magnet assembly 15 illustrated in FIG. 2A. The switchable magnet 12 with the rectangular shape may be sectioned to reduce the storage size of the energy storage device. FIG. 8 illustrates the switchable magnet 12 with the rectangular shape sectioned in an arrangement similar to the ten-section arrangement of the switchable magnet 12 illustrated in FIG. 4.

Figure 9A:
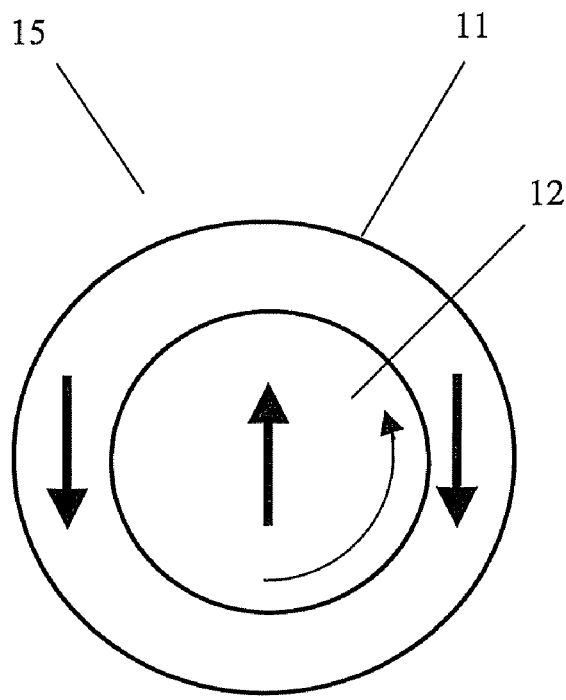
FIG. 9A and 9B, collectively referred to as FIG. 9, illustrate an exemplary embodiment of changing magnetization mechanically.
Figure 9B:
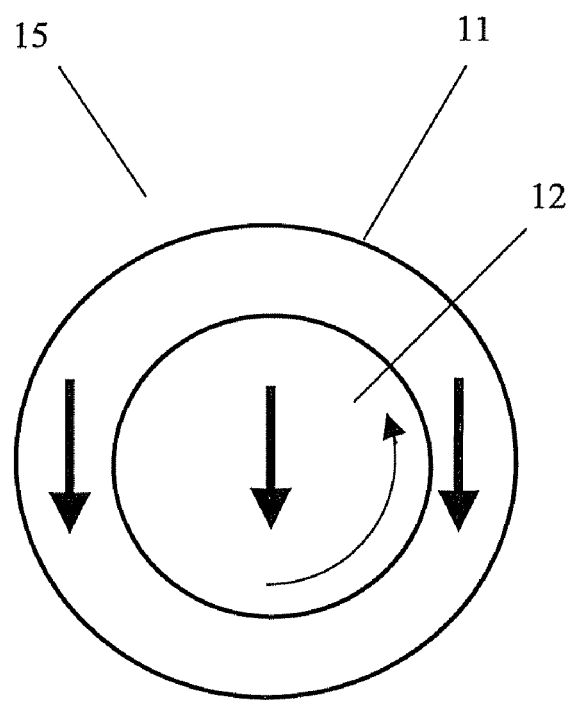

A fourth embodiment of the configurable magnet assembly 15 is illustrated in FIG. 9. Referring to FIG. 9A, the configurable magnet assembly 15 includes the permanent magnet 11 and the switchable magnet 12. In the embodiment illustrated in FIG. 9, the configurable magnet assembly 15 can switch from the zero-dipole mode to the full-dipole mode and then back to the zero-dipole mode using a mechanical switching technique. The mechanical switching technique mechanically rotates the switchable magnet 12 through about 180 degrees with respect to the permanent magnet 11 to change from one mode to another mode. The mechanical switching technique also includes rotating the permanent magnet 11 or a combination of rotating the permanent magnet 11 and the switchable magnet 12 where the permanent magnet 11 and the switchable magnet 12 are displaced about 180 degrees with respect to each other. The directions of magnetization of the permanent magnet 11 and the switchable magnet 12 in the zero-dipole mode are depicted by the arrows in FIG. 9A. The directions of magnetization of the permanent magnet 11 and the switchable magnet 12 in the full-dipole mode are depicted by the arrows in FIG. 9B.

The embodiments of the configurable magnet assembly 15 discussed above have the following advantages over prior art magnets used in the logging instrument 10. (1) The configurable magnet assembly 15 enables passage through a ferromagnetic surface casing of the borehole 2 without the high attractive force of the prior art magnets. (2) If the permanent magnet 11 and the switchable magnet 12 are made with non-equal dipole moments, then the configurable magnet assembly 15 can be set to two or more different net dipole moments. The two or more different net dipole moments can facilitate measurements in a number of substantially separate NMR frequencies and frequency ranges. The substantially separate NMR frequencies and frequency ranges are generally distinguishable by electronics known in the art. Net dipole moments less than the fall-dipole mode are referred to as "reduced-dipole modes." The configurable magnet assembly 15 can also be switched to configurations of different symmetry and used in side-looking and centralized configurations. (3) It is acceptable for the switchable magnet 12 to experience some irreversible magnetization loss because the switchable magnet 12 can be re-magnetized. Allowing some irreversible magnetization loss allows for use of a larger selection of magnetic materials.

As discussed above, the configurable magnet assembly 15 may be used to perform NMR and NQR measurements in one logging instrument 10. Any practical configurable magnet assembly 15 in the zero-dipole mode may still have some residual magnetic dipole. Because the NQR measurements are essentially zero magnetic field measurements, a strength of the residual magnetic field that can be tolerated in order to perform the NQR measurements is determined next.

When a static magnetic field is present during an NQR resonance measurement, perturbation theory can be used when $$\frac{\gamma B_0}{2\pi} << Q_{CC}$$

where $\gamma$ is the gyromagnetic ratio, $B_0$ is a static magnetic field intensity, and $Q_{CC}$ is the quadrupole coupling constant. Quadrupole coupling constants for $^{27}Al$ in minerals are usually less than 4.0 MHz. Thus, $B_0$ can be as large as 0.01 T. When $B_0$ is about 0.01 T and an asymmetry parameter is not zero, the NQR resonance splits into two pairs of lines. One of these pairs of lines is very weak. Splitting of the other pair of lines is no larger than $\pm\gamma B_0/\pi$. In order to excite an entire NQR resonance, the splitting caused by the static magnetic field should be less than the bandwidth of the NQR resonance. The bandwidth for a pulsed experiment is $1/\tau_p$, where $\tau_p$ is a pulse width. Thus, $$\gamma B_0 < \frac{1}{2\tau_p}.$$

Therefore, for the pulse width of 20 μsec, the static magnetic field intensity that is less than one Gauss can be ignored.

Figure 10:
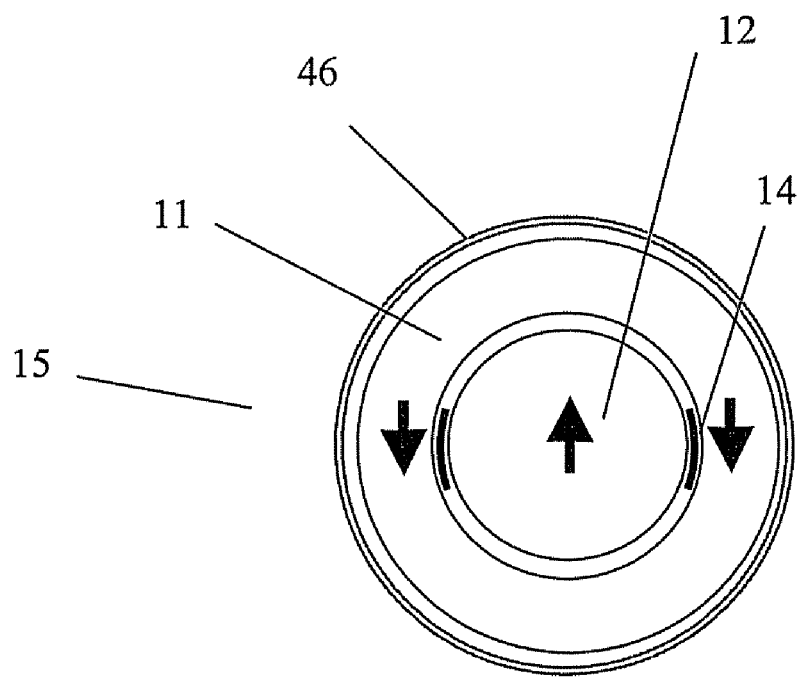
FIG. 10 illustrates a first exemplary embodiment of a magnetic shield.
Figure 11:
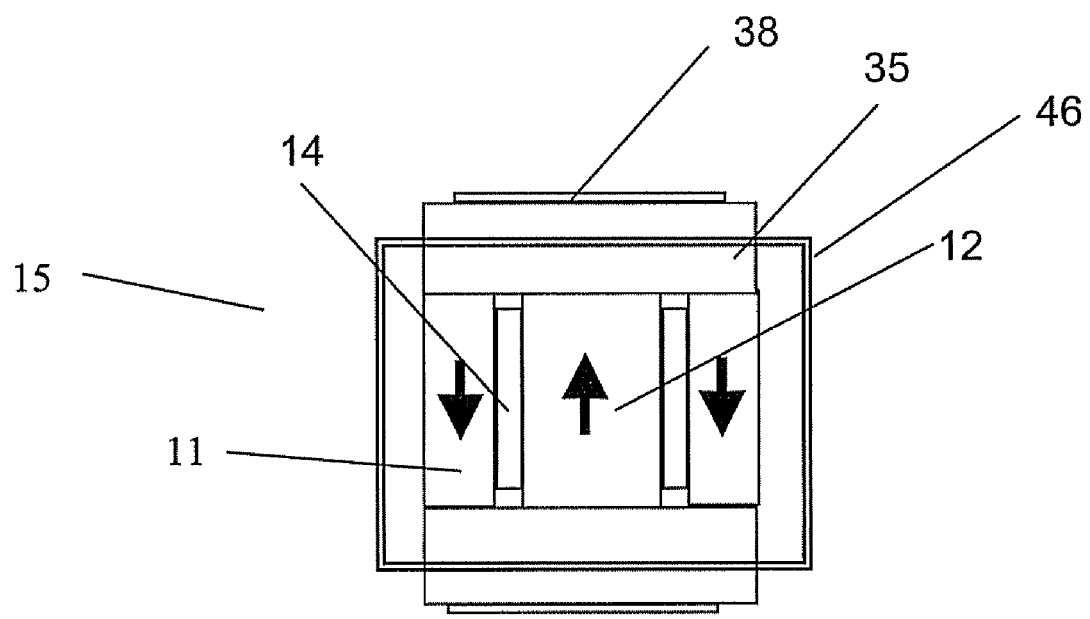
FIG. 11 illustrates a second exemplary embodiment of the magnetic shield.

In order to have the residual magnetic field below one Gauss, a magnetic shield made of a high magnetic permeability material can be used. Exemplary embodiments of a magnetic shield 46 are presented in FIG. 10 and 11. Referring to FIG. 10 and 11, the magnetic shield 46 is thin enough to be saturated by the magnetic field in the full-dipole mode. Saturation magnetic flux in the magnetic shield 46 is negligible compared to a magnetic flux generated by the magnet assembly in the full-dipole mode. In a zero-dipole mode, a small residual magnetic flux can be shielded by the magnetic shield 46, which practically eliminates any residual external magnetic field.

Referring to FIG. 11, the magnetic shield 46 is disposed between two parts (an inner part and an outer part) of the soft magnetic element 35. The inner part includes the main magnetic flux from the magnet. The outer part includes magnetic flux from the antenna wire 38 and prevents the antenna wire 38 from interacting with the conductive magnetic shield 46.

Figure 12:
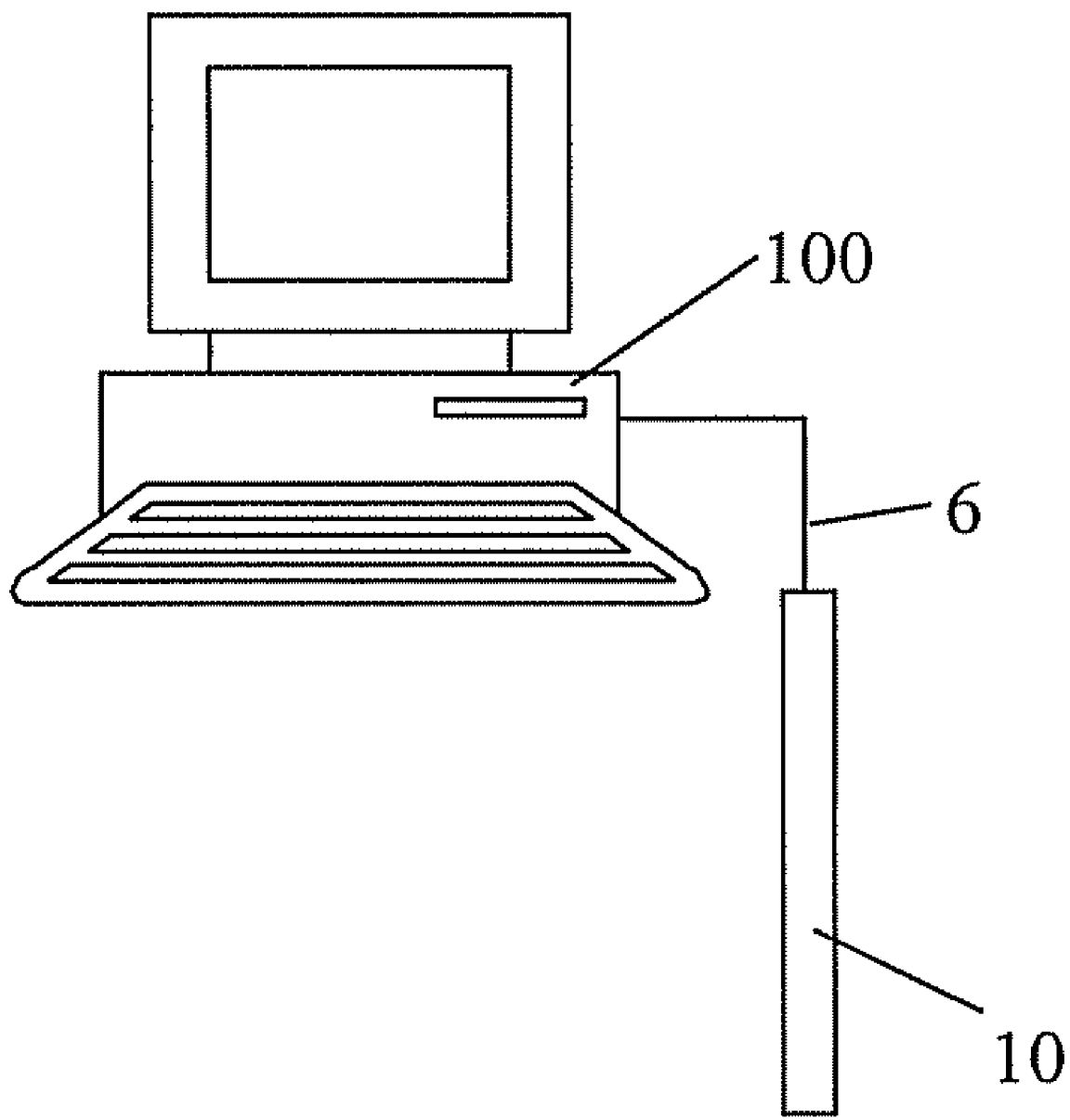
FIG. 12 illustrates an exemplary embodiment of a computer coupled to the logging instrument.

Various digital and/or analog systems may be used to operate the configurable magnet assembly 15. Referring to FIG. 12, an exemplary embodiment of an apparatus for implementing the teachings herein is depicted. In FIG. 12, the apparatus includes a computer 100 coupled to the well logging instrument 10. Generally, the computer 100 includes components as necessary to provide for operating the configurable magnet assembly 15 disposed in the well logging instrument 10. Exemplary components include, without limitation, at least one processor, storage, memory, input devices, output devices and the like. As these components are known to those skilled in the art, these are not depicted in any detail.

Generally, the teachings herein are reduced to an algorithm that is stored on machine-readable media. The algorithm is implemented by the computer 100 and provides the configurable magnet assembly 15 with desired output.

Figure 13:
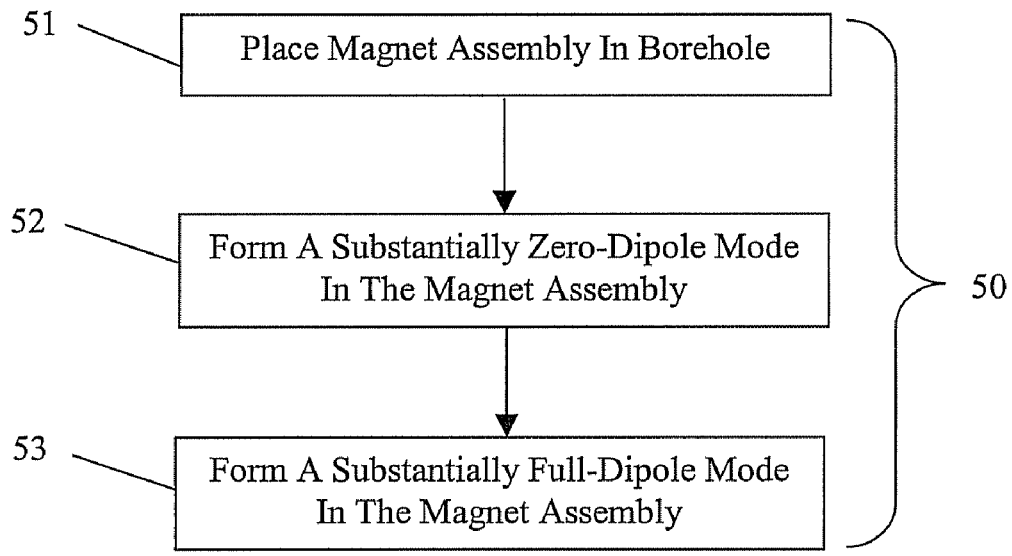
FIG. 13 presents an exemplary method for configuring the configurable magnet assembly in the borehole.

FIG. 13 presents an exemplary method 50 for configuring the configurable magnet assembly 15. The method 50 calls for placing 51 the magnet assembly 15 in the borehole 2. Further, the method 50 calls for forming 52 the zero-dipole mode in the configurable magnet assembly 15. In the zero-dipole mode, at least one of the NQR measurements may be performed and the magnet assembly 15 moved in the borehole 2 without a substantial magnetic attraction on the ferromagnetic surface casing. Further, the method 50 calls for forming 53 the full-dipole mode in the configurable magnet assembly 15 for performing the NMR measurements.

Figure 14:
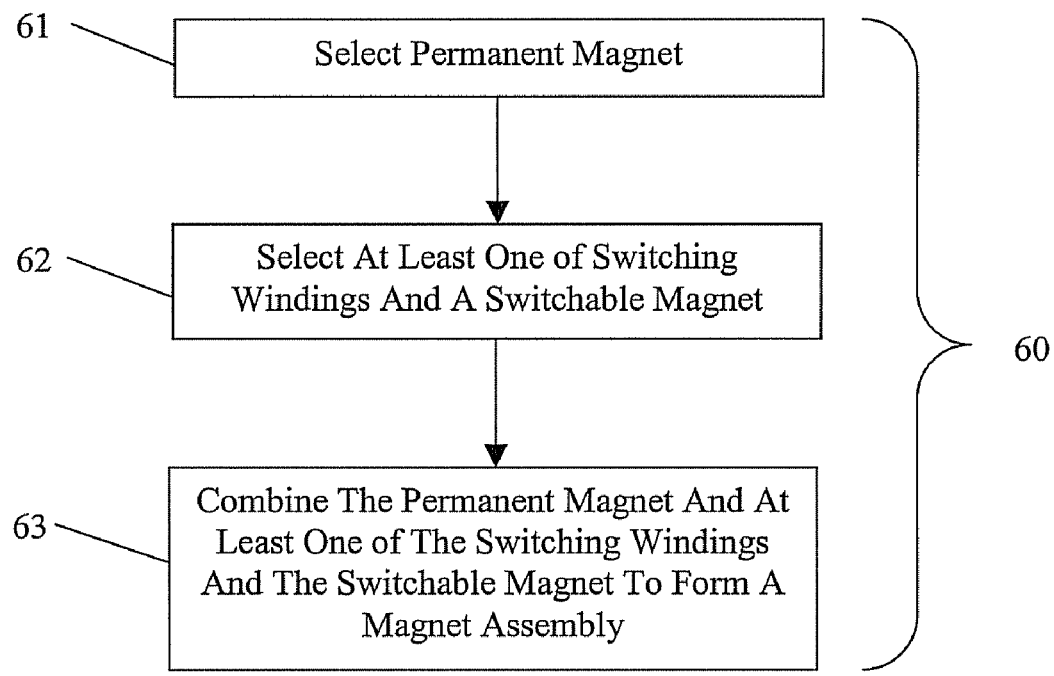
FIG. 14 presents an exemplary method for producing the configurable magnet assembly.

FIG. 14 presents an exemplary method 60 for producing the magnet assembly 15. A first step 61 calls for selecting the permanent magnet 11. A second step 62 calls for selecting at least one of the switching windings 14 and the switchable magnet 12. A third step 63 calls for combining the permanent magnet 11 and at least one of the switching windings 14 and the switchable magnet 12 to form the configurable magnet assembly 15.

In support of the teachings herein, various components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), vacuum supply, pressure supply, refrigeration (i.e., cooling) unit or supply, heating component, motive force (such as a translational force, propulsional force or a rotational force), magnet, electromagnet, sensor, transmitter, receiver, transceiver, controller, optical unit, electrical unit or electromechanical unit may be included in support of the various aspects discussed herein or in support of other functions beyond this disclosure.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A magnet assembly for measuring properties of a formation from a borehole, the magnet assembly comprising:
    a first device and a second device, each device adapted for insertion into the borehole, the first device producing a first magnetic field, the second device producing a second magnetic field;
    wherein the second magnetic field is configurable for one of reinforcing and reducing the first magnetic field to produce a magnetic field used for the measuring; and wherein the first device comprises a permanent magnet and the second device comprises at least one of one of a switchable magnet configured to have a direction of the second magnetic field reversed within the switchable magnet and switching windings.

2. The assembly as in claim 1, wherein the reinforcing enables nuclear magnetic resonance (NMR) measurements.

3. The assembly as in claim 1, wherein the reducing enables at least one of nuclear quadrapole resonance measurements, nuclear magnetic resonance (NMR) measurements with a substantially separate frequency range, and movement of the magnet assembly in the borehole without a substantial magnetic attraction to a magnetic casing.

4. The assembly as in claim 1, further comprising a magnetic material disposed between magnetic poles of the permanent magnet and the switchable magnet, the material for conducting magnetic flux.

5. The assembly as in claim 4, wherein the magnetic material comprises at least one of high saturation and non-conductivity properties.

6. The assembly as in claim 4, wherein the magnetic material comprises an antenna winding for nuclear magnetic resonance measurements.

7. The assembly as in claim 4, further comprising a magnetic shield for reducing a residual magnetic field external to the assembly to essentially zero.

8. The assembly as in claim 4, wherein the switching windings and at least one of the permanent magnet, the switchable magnet, and the magnetic material are divided into sections essentially aligned about a longitudinal axis, wherein the switching windings are adapted for being energized sequentially.

9. The assembly as in claim 1, further comprising a magnetic probe for adjusting an amplitude of the second magnetic field to reduce the first magnetic field.

10. The assembly as in claim 1, wherein the permanent magnet comprises a hollow cylindrical shape and the switchable magnet comprises a cylindrical shape, wherein the switchable magnet is adapted for placement internal to the permanent magnet.

11. The assembly as in claim 10, wherein the switching windings and at least one of the permanent magnet and the switchable magnet are divided into sections essentially aligned about a longitudinal axis, wherein the switching windings are adapted for being energized sequentially.

12. The assembly as in claim 1, wherein the permanent magnet comprises a hollow cylindrical shape and the switching windings are disposed internal and external to the permanent magnet.

13. A method for producing a magnet assembly, the assembly adapted for use in a borehole, the method comprising:
    selecting a permanent magnet configured to produce a first magnetic field;
    selecting at least one of switching windings and a switchable magnet, each configured to produce a second magnetic field configurable for one of reinforcing and reducing the first magnetic field, the switchable magnet being further configured to have a direction of the second magnetic field reversed within the switchable magnet; and
    combining the permanent magnet and at least one of the switching windings and the switchable magnet to form the assembly.

14. The method as in claim 13, further comprising placing an antenna winding in the assembly.

15. The method as in claim 13, further comprising placing a magnetic shield in the assembly.

* * * * *